United States Patent [19]

Kazaoka et al.

[11] Patent Number: 4,726,623
[45] Date of Patent: Feb. 23, 1988

[54] SEAT APPARATUS FOR VEHICLES

[75] Inventors: Kenichi Kazaoka, Nagoya; Hiroshi Okazaki, Toyota, both of Japan

[73] Assignee: Aisin Seiki Kabushiki Kaisha, Japan

[21] Appl. No.: 910,265

[22] Filed: Sep. 19, 1986

Related U.S. Application Data

[63] Continuation of Ser. No. 618,951, Jun. 8, 1984.

[30] Foreign Application Priority Data

Jun. 28, 1983 [JP] Japan ................................ 58-116581
Jun. 29, 1983 [JP] Japan ................................ 58-117691

[51] Int. Cl.⁴ ............................................. A47C 7/02
[52] U.S. Cl. ...................................... 297/452; 297/455; 248/419
[58] Field of Search ............... 297/452, 455, 341, 339, 297/338, DIG. 2; 248/419, 421, 429; 108/124

[56] References Cited

U.S. PATENT DOCUMENTS

| | | | |
|---|---|---|---|
| 2,703,137 | 3/1955 | Bierman | 108/124 |
| 2,791,477 | 5/1957 | Wesbecher | 108/124 |
| 2,826,241 | 3/1958 | Himka | 297/341 |
| 3,669,496 | 6/1972 | Chisholm | 297/455 X |
| 3,924,893 | 12/1975 | Ferrara | 297/455 |
| 4,043,529 | 8/1977 | Pickles | 248/419 |
| 4,065,182 | 12/1977 | Braniff et al. | 297/452 |
| 4,296,694 | 10/1981 | Kobayashi | 248/421 X |
| 4,402,546 | 9/1983 | Johnson | 297/355 X |
| 4,509,796 | 4/1985 | Takagi | 297/452 |

Primary Examiner—Peter A. Aschenbrenner
Attorney, Agent, or Firm—Finnegan, Henderson, Farabow, Garrett & Dunner

[57] ABSTRACT

The seat apparatus for vehicles according to the invention includes at least a seat cushion.

And the seat cushion has a frame member made of plastics and a cushion foam member mounted thereon. The frame member has a hollow portion therein so as to increase a mechanical strength thereof. Further, at least the front side thereof is supported by a supporting member mounted on a bracket. Therefore, the frame member is reinforced by the supporting member.

7 Claims, 10 Drawing Figures

SEAT APPARATUS FOR VEHICLES

This application is a continuation of application Ser. No. 618,951 filed June 8, 1984.

BACKGROUND OF THE INVENTION

1. Field of the Inventon

The present invention relates to a seat apparatus for vehicles, and particularly to an improvement in a frame of the seat apparatus.

2. Description of the Prior Art

A conventional seat apparatus for vehicles includes a seat cushion and a seat back. As shown in FIGS. 9 and 10, the conventional seat cushion and the seat back are respectively mounted on a frame 10a having enough mechanical strength. In vehicles having the conventional seat apparatus, the fram 10a is typically made of plastics so as to be made lighter and to improve fuel economy of the vehicle.

However, the frame 10a is usually shaped so as to extend upwardly along the outer edges as shown in FIGS. 9 and 10 so that the frame 10a should support the seat cushion 3 or the seat back (not shown) without any sliding movement thereof. Accordingly, since plastics do not provide sufficient mechanical strength, the frame 10a must be formed so that the outer upward extending shape lacks bending and improves torsional rigidity. Consequently, the plastic frame must be formed thick. Therefore, since the frame 10a should have enough thickness, the light weight for the frame 10a is not expected.

As mentioned above, the frame 10a made of plastics is easily deformed. Therefore, when the vehicle crashed, the front end of frame 10a is deformed by the load from the occupant so that in spite of wearing the seat belt, the occupant will be shifted along the seat between the seat belt and the seat cushion and be pushed out of the seat.

SUMMARY OF THE INVENTION

Therefore, it is a primary object to solve the above drawbacks in the seat having the frame made of platics. And another object is to provide the improved seat in a simple structure.

According to the invention, the frame made of plastics is formed as a hollow shape. Since the frame has a hollow portion, the frame has enough strength in a simple structure.

In addition, at least the front side of the frame is supported by a seat bracket so that the front side of the frame has enough strength.

The accompanying drawings, which are incorporated in and constitute part of this specification, illustrate one embodiment of the invention and, together with the description, serve to explain the principles of the invention.

DETAILED DESCRIPTION OF THE PREFERRED EMBODIMENT

Figure 1:
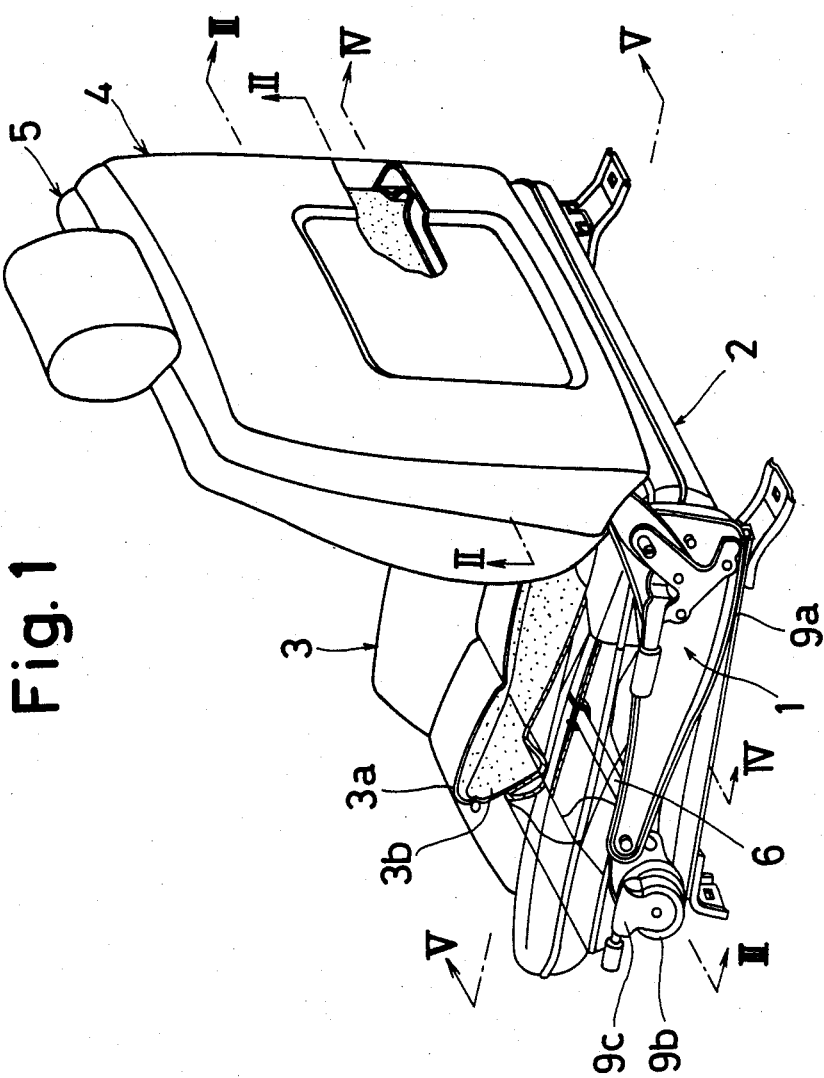
FIG. 1 is a perspective view of a seat having a frame according to the invention.

Now referring to FIG. 1, a seat for vehicles according to the invention is shown. The seat includes a seat back 5 and a seat cushion 3, and the seat back 5 and the set cushion 3 are supported by a seat adjuster 1. The set adjuster 1 has a seat lifter 9b and the seat slide 9a. The set lifter 9b is provided below the seat cushion 3 and the seat back 5, and vertical moveably supports thereof. The seat slide 9a is disposed between the seat lifter 9b and the vehicle floor, and slidably supports the seat back 5 and the seat cushion 3 in a back and forth direction.

The seat cushion 3 has a cover 3a, a cushion foam 3b, and a seat frame 2. The cusion foam 3b covered by the cover 3a, flexible supports an occupant thereon and is supported as a unit by the frame 2. The frame 2 is formed as a substantially rectangular shape. And the edge portion thereof is extended upwardly so that the cushion foam 3b is held by the edge portion of the seat frame 2. Further, the rim portion of the cover 3a is also fixed on the seat frame 2.

Figure 3:
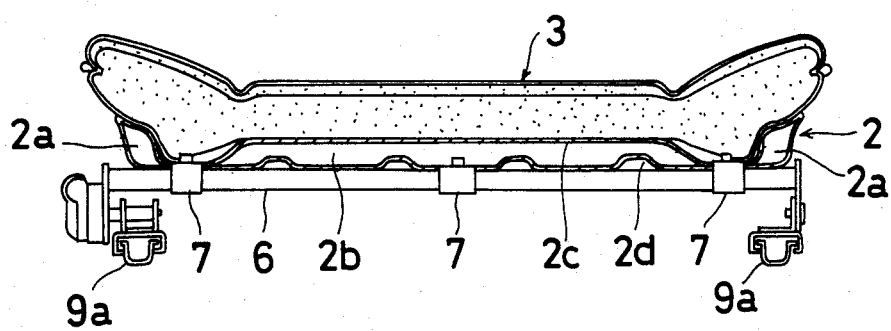
Figure 4:
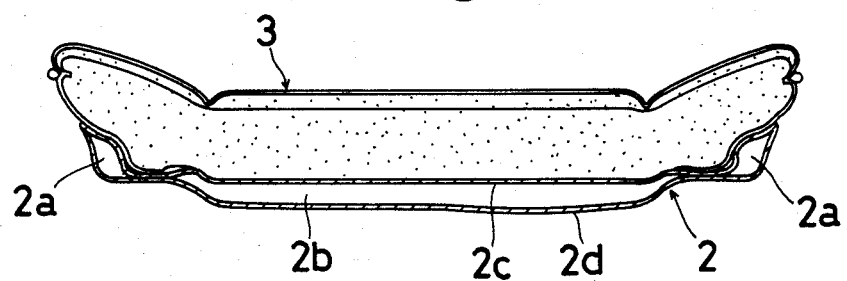

The seat frame 2 is made of plastics and formed as a hollow shape shown in FIGS. 3 and 4 by blow molding. A hollow portion 2a is provided in the edge portion of seat frame 2 so that the edge portion has enough mechanical strength in a simple struture. Further, the main portion of the frame 2 is positioned below the cushion material 3b and also another hollow portion so as to provide enough mechanical strength.

Particularly, an upper plate 2c of the main portion has an elasticity but any extraordinary deformation of the upper plate 2c is arrested by a lower plate 2d of the main portion of the frame 2. The upper and lower plate 2c and 2d are fixedly attached along respective ends. Since both hollow portions 2a and 2b are independent, it is hard to shift the upper plate 2c against the lower plate 2d.

Figure 2:
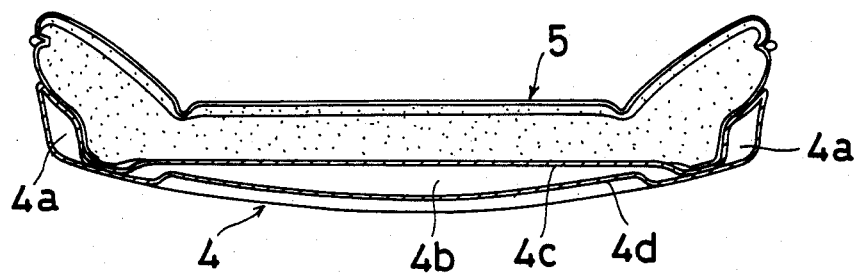
FIGS. 2 to 5 are sectional views taken along line II—II, III—III, IV—IV, and V—V in FIG. 1 respectively.

Furthermore, as shown in FIG. 2, a back frame 4 is provided in the seat back 5, and the back frame 4 is formed by the same method seat frame 2. Namely, the frame 4 has a hollow portion 4a in the edge thereof and another hollow portion 4b in the main portion thereof. And an upper plate 4c elastically supports the cushion foam but the extraordinary deformation thereof is arrested by a lower plate 4d.

Figure 5:
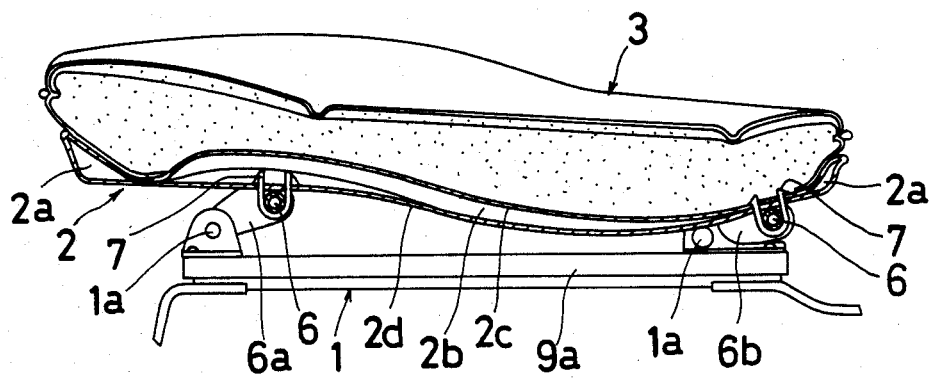

The seat lifter 9b of the seat adjuster 1 includes a pair of front and rear links 6a, 6b as shown in FIG. 5. Each pair of front and rear links 6a, 6b are respectively provided below both side of the front and rear sides of the seat cushion 3, and are interconnected through a supporting pipe 6,6 or rod fixedly disposed between the links 6a, 6b as shown in FIG. 3. And the pipes 6,6 respectively support the front and rear side of the frame 2 so as to provide the mechanical strength therein. A plurality of clips 7 are rotatably mounted on the both pipes 6,6 and the clips 7 are engaged with the frame 2.

The front and rear links 6a, 6b are respectively pivoted on the seat slide 9a with pivot pins 1a. One of links 6a, 6b is operatively connected to clutch means 9c so that by operating the clutch means 9c, the link is rotated around the pin 1a and all links 6a, 6b are rotated through the frame 2, enabling the height of the frame 2 or the seat cushion 3 to be changed.

The seat slide 9a of the seat adjuster 1 includes a pair of guide rails mounted below both sides of the seat. Each guide rail has an upper rail and lower rail, and the upper rail supports the seat through the seat lifter 9b and the lower rail is fixedly mounted on the vehicle floor. Since the upper rail is slidably engaged with the lower rail, the position of the seat is changed by operating a locking means (not shown).

Figure 6:
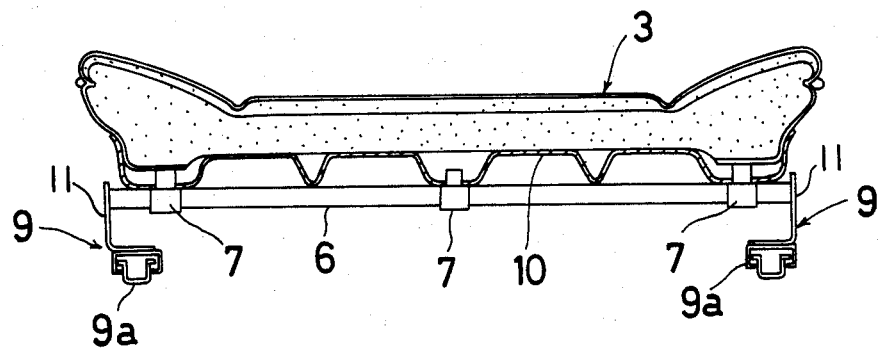
FIGS. 6 and 7 are sectional views of another embodiment according to the invention similar to FIGS. 3 and 5 respectively.
Figure 7:
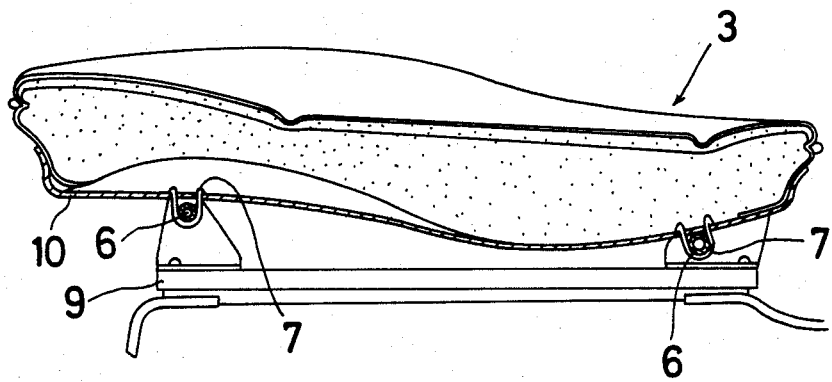

Another embodiment according to the invention is shown in FIGS. 6 and 7. The seat apparatus depicted in FIGS. 6 and 7 is similar to the above embodiment shown in FIGS. 1 to 5 except for a frame 10 and a seat adjuster 9.

Figure 8:
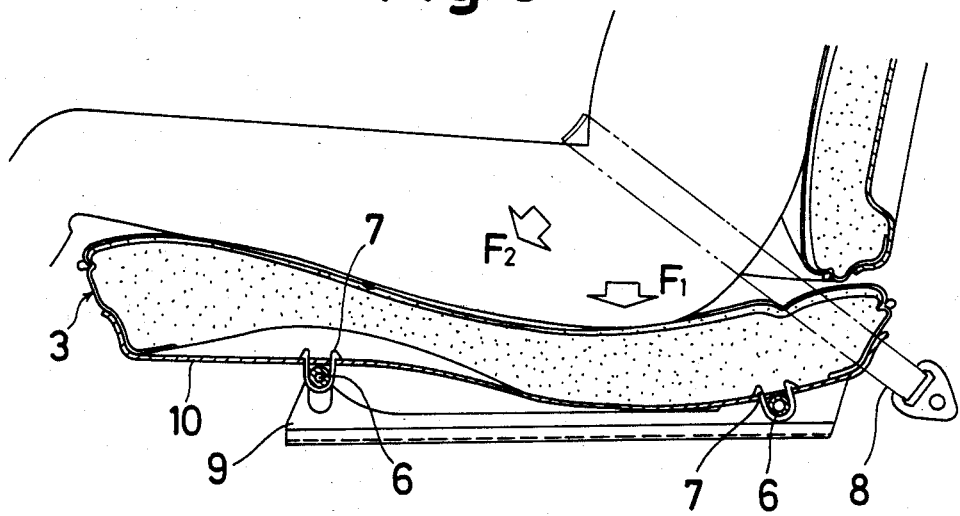
FIG. 8 is a sectional view similar to FIG. 7 but showing the state that the occupant sits on the seat embodiment.
Figure 9:
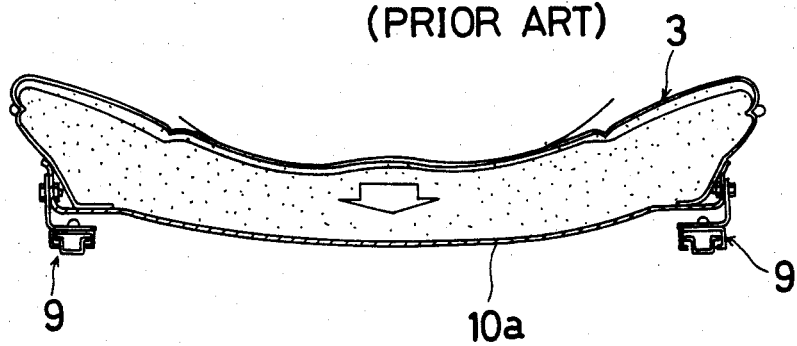
FIGS 9 and 10 are sectional views of the conventional seat apparatus viewed similar to FIG. 3.
Figure 10:
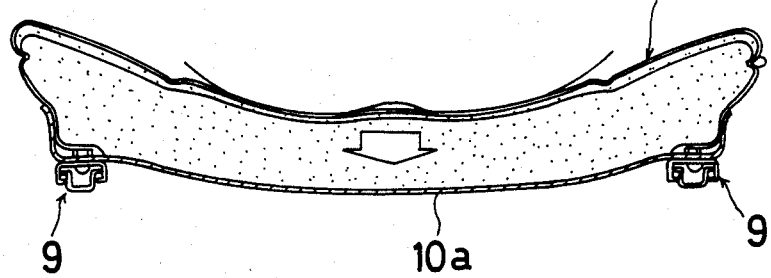

Namely, the frame 10 is made of plastics and is formed having an upwardly opened shape along its outer edges. And the set adjuster 1 includes the seat slide 9a, as previously described and the pipes 6,6 support the front and rear sides of the frame 10. The pipes 6,6 are supported on flanges 11 mounted on each seat slide 9a. Thus, since the front and rear sides of the frame 10 are reinforced by the pipes 6,6, the front and rear sides of the frame 10 have enough mechanical strength against the downward load drawn by an arrow (F1) from the occupant as shown in FIG. 8.

If the vehicle is stopped suddenly, the occupant on the seat cushion 3 will immediately slide forward. Provided the occupant wears a seat belt 8 as shown in FIG. 8, the occupant will be pressed in the direction drawn by an arrow (F2) and slide along the seat cushion 3 between the seat cushion 3 and the seat belt 8. Because the front side of the frame 10 has enough mechanical strength, the sliding movement of the occupant can be arrested by the seat apparatus of the present invention.

In the seat apparatus shown in FIGS. 1 to 5, the front side of the frame 2 is also supported by the pipe 6. Therefore, the sliding movement of the occupant is also arrested.

What is claimed is:

1. A vehicle seat, which comprises:
   a seat cushion;
   frame means for supporting said seat cushion and including a lower support plate and a resilient plastic upper plate, said lower support plate having a main interior portion and a retaining ledge extending upward around a periphery of said main interior portion, said retaining ledge having an upper end surface, said upper plate being fixedly connected to said lower support plate along said upper end surface, said upper plate having a curvilinear cross-sectional configuration and being slidably connected to said lower support plate proximate said periphery of said main interior portion to define a first hollow portion along said retaining ledge and said periphery of said main interior portion, said upper plate also defining a second hollow portion, said upper plate also defining a second hollow portion within said periphery of said main interior portion, said upper plate normally being spaced from said lower support plate along said first and second hollow portions, said upper plate being flexible in response to an excessive load force thereby stretching of said first hollow portion simultaneously with said second hollow portion so that said upper plate substantially conforms to said lower plate along at least a portion of said retaining ledge and said periphery of said main interior portion, said lower support plate arresting movement of said upper plate;
   support means for securely supporting said frame means in the vehicle;
   rod members extending beneath said frame means in the vehicle;
   attachment means mounted on said support means for connecting said rod members to said support means; and
   a plurality of clip means for attaching said frame means to said rod members and for limiting the movement of said frame means relative to said rod members.

2. The seat apparatus of claim 1, wherein said frame means has a substantially rectangular cross-sectional configuration for supporting a seat occupant.

3. The seat apparatus of claim 1, said support means including a pair of lower rails mounted in parallel in the vehicle, an upper rail slidably mounted on each of said pair of lower rails, bracket means for securing said pair of lower rails on a floor of the vehicle, and adjustment means for regulating the position of each of said upper rails relative to said corresponding lower rail.

4. The seat apparatus of claim 1, said attachment means including forward and rearward flanges secured to each of said upper rails, forward link means pivotally connecting said forward flanges to one of said rod members, and rearward link means pivotally connecting rails rearward flanges to another one of said rod members, and control means for adjustably positioning said link means to raise and lower said frame means.

5. The seat apparatus of claim 1, also including a backrest pivotally attached to said support means and a back cushion, said backrest having a front plate and a rear plate, said front plate being mounted on said rear plate, wherein said rear plate includes an outer wall extending around a substantial portion of the periphery of said rear plate for securing said backrest cushion to said backrest.

6. The seat apparatus of claim 5 also including control means for adjustably positioning said backrest relative to said support means.

7. The seat apparatus of claim 1, wherein said plurality of clip means include clip members affixed to said frame means and extending around rod members.

* * * * *